UNITED STATES PATENT OFFICE.

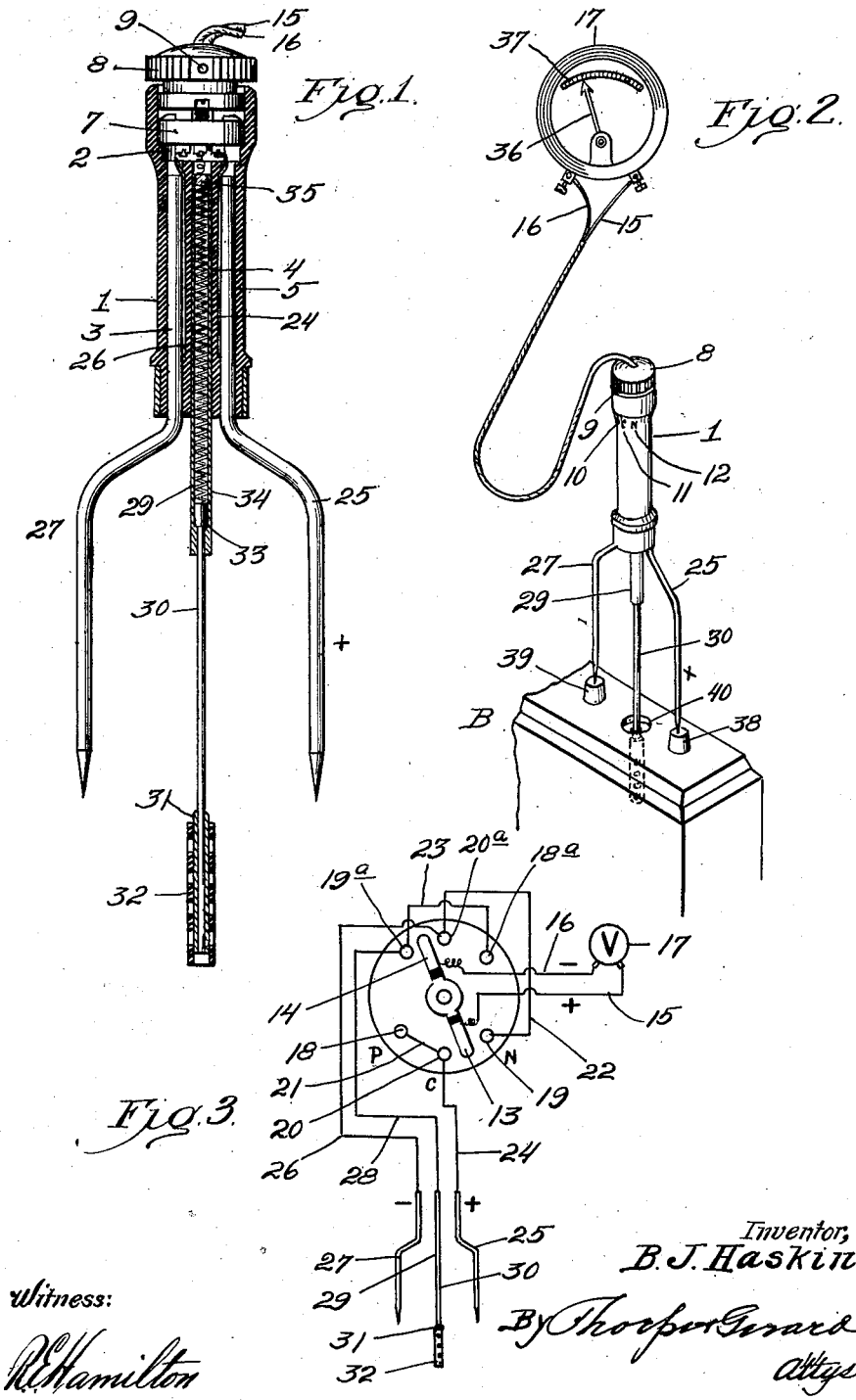

BUTLER J. HASKINS, OF KANSAS CITY, MISSOURI.

CADMIUM TEST DEVICE.

1,426,868.  Specification of Letters Patent.  Patented Aug. 22, 1922.

Application filed May 10, 1920. Serial No. 380,275.

*To all whom it may concern:*

Be it known that I, BUTLER J. HASKINS, a citizen of the United States, and resident of Kansas City, in the county of Jackson and State of Missouri, have invented a certain new and useful Improvement in Cadmium Test Devices, of which the following is a complete specification.

This invention relates to cadmium devices for testing the condition of a storage battery cell and my object is to produce a device of a character to test the cells and plates without changing the position of the device with respect to the cell, as is necessary with the cadmium test sets consisting of independent positive and negative prods and a cadmium prod mounted on the negative prod.

More specifically, my object is to produce a cadmium test device, which, by enabling the operator to note the result of the various tests, without changing the position of the device, minimizes the change of error through misreading the meter or of confusing the readings thereof or of the shifts or changes of position necessary with the prods of the ordinary testing sets, and the consequent necessity of repeating the tests to make sure of the condition of the cell or of the plates thereof.

With these objects in view, the invention consists in certain novel and useful features of construction and combinations of parts as hereinafter described and claimed; and in order that it may be fully understood reference is to be had to the accompanying drawing, in which:

Figure 1 is a central vertical section of a cadmium test device embodying the invention.

Figure 2 is a view partly in perspective and partly in elevation showing the cadmium test device in operative position with respect to a battery cell.

Figure 3 is a diagrammatic view of the cadmium test device.

In the said drawing, 1 indicates a handle of insulating material provided with a socket or chamber 2 at its upper end, and with a plurality of parallel bores or passages 3, 4 and 5, extending from said chamber to the lower end of the handle.

Mounted in the socket in the upper end of the handle is a switch, shown as composed of a stationary member 7 and a rotatable member 8, the latter having an indicating point 9 adapted to be disposed in longitudinal alinement with one of the points or markings 10, 11, or 12 on the handle.

The rotary member 8 of the switch embodies a pair of contact arms 13 and 14 insulated from each other and respectively connected by conductors 15 and 16 to a volt meter 17, which volt meter may be mounted on the handle or at any convenient point with respect thereto.

The stationary member of the switch is provided with three sets of contacts, 18 and 18$^a$, 19 and 19$^a$, and 20 and 20$^a$, the contacts of each set being disposed at diametrically opposite sides of the axis of the rotatable member and within the sweep of the adjacent arms 13 and 14 thereof respectively. The contacts 18 and 20 are electrically connected as at 21, the contacts 19 and 20$^a$ are electrically connected as at 22, and the contacts 18$^a$ and 19$^a$ are electrically connected as at 23. The contact 20 is electrically connected to a conductor 24 in the bore 5 of the handle, and is also electrically connected to a pointed prod 25. The contact 20$^a$ is electrically connected by a conductor 26 set in the bore or passage 3, with the stem of a second prod 27, the same being pointed like prod 25 and of equal length. The contact 19$^a$ is electrically connected at 28 to a tube set in the bore 4 of the handle, and said tube is constricted at its lower end to slidingly receive the stem 30 equipped with a cadmium contact at its lower end, covered by a perforated sheath of rubber or the like 32. The stem 30 is provided within the bore of the tube with an enlargement or head 33 to limit the forward sliding movement of the stem and prevent dislocation thereof from the tube under the pressure of a spring 34 confined within the tube and bearing at its opposite or upper end against a plug 35 in said tube.

The index finger 36 of the volt meter plays across the scale 37 thereof; and B represents a battery cell of any suitable type, provided with the customary lead or equivalent poles 38 and 39, and with the filling hole 20 through which water may be added to the electrolyte within the cell.

To test the condition of the positive plates of the cell, the switch member 8 is turned to cause contact 13 to engage contact 18, and contact 14 to engage 18ª. The pointed ends of the prods 27 and 25 respectively are then disposed upon the lead terminals 38 and 39 with sufficient pressure to slightly penetrate them in order to obtain a good contact, and the cadmium prod at the same time is fitted down through the opening 40 into the electrolyte in the cell. With the parts thus arranged the circuit will be as follows: Through pole 38, prod 25, conductor 24, contact 20, conductor 21, contact 18, switch arm 13, conductor 15, volt meter 17, conductor 16, switch arm 14, contact 18ª, conductor 23, contact 19ª, conductor 28, tube 29, then through the positive plates, the cadmium prod to the electrolyte, and then to the pole or terminal 38. This circuit will cause the index finger 36 to swing to the right upon the volt meter scale reading 37 and show the condition of the positive plates of the cell.

To test the condition of the negative plates of the cell without changing the position of the testing device, the switch member 8 is then turned to dispose contact arm 14 in engagement with contact 19ª. The reading will then be as follows: from the cadmium prod, through conductor 28, contact 19ª, contact arm 14, conductor 16, volt meter 17, conductor 15, arm 13, contact 19, conductor 22, contact 20ª, conductor 26, negative prod 27, the negative pole or terminal 39, and through the negative plates and the electrolyte to the immersed cadmium prod. This circuit will cause the index finger to swing in the opposite direction to that which it moves for the positive plate test, and the sum of the two readings should equal the capacity of the cell.

To test the voltage of the switch, the switch member 8 is turned to disposed switch arm 13 in engagement with contact 20, and switch arm 14 in engagement with contact 20ª. As thus arranged the circuit is as follows: from the positive pole, through prod 25, conductor 24, contact 20, switch arm 13, conductor 15, volt meter 17, conductor 16, switch arm 14, contact 20ª, conductor 26, prod 27, negative pole 39 and back through the elements of the battery to pole 38. The adjustment of the switch insures the establishment of a single current.

I claim:

1. A cadmium test device, comprising a handle, a pair of prods and a cadmium electrode carried thereby, a volt meter, and a switch for completing a circuit through the volt meter and either of said pair of prods and the cadmium electrode, or through said pair of prods and said volt meter.

2. A cadmium test device, comprising a handle, a pair of prods and a cadmium electrode carried thereby, a volt meter, and a rotatable switch mounted on the handle, for completing a circuit through the volt meter and either of said pair of prods and the cadmium electrode, or through said pair of prods and said volt meter.

3. A cadmium test device, comprising a handle, a pair of prods and a cadmium electrode carried thereby, a volt meter, and a switch for completing a circuit through the volt meter and either of said pair of prods and the cadmium electrode, or through said pair of prods and said volt meter; said cadmium electrode being of length to project beyond the corresponding ends of said pair of prods.

4. A cadmium test device, comprising a handle, a pair of prods and a cadmium electrode carried thereby, a volt meter, and a switch for completing a circuit through the volt meter and either of said pair of prods and the cadmium electrode or through said pair of prods and said volt meter; said cadmium electrode being yieldingly projected beyond the corresponding ends of said pair of prods.

5. A cadmium test device, comprising a handle provided with a pair of prods, a cadmium electrode disposed between said pair of prods, a volt meter, and a switch for completing a circuit through the volt meter and either of said pair of prods and the cadmium electrode, or through said pair of prods and said volt meter; said cadmium electrode comprising a tube fitted in said handle and provided with a constricted front end, a rod extending slidingly through said constricted end of the handle and provided within said tube with an enlargement, and a spring fitting in said tube and exerting pressure against the said rod to yieldingly project the same beyond the ends of the said pair of prods.

6. A cadmium test device, comprising a pair of prods, a cadmium electrode, a volt meter, and a switch for completing a circuit through the volt meter and either of said prods and the electrode, or through said pair of prods and the volt meter.

In witness whereof I hereto affix my signature.

BUTLER J. HASKINS